Figures 1A, 1B:
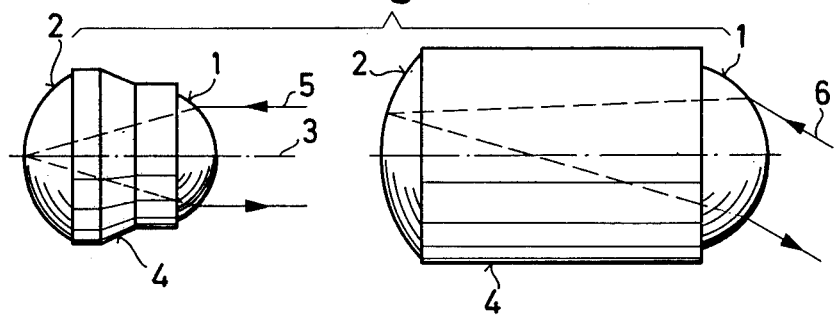

United States Patent [19]
> Schwab et al.

[11] 4,012,215
[45] Mar. 15, 1977

[54] PRECISION MOLDING OF SHAPED BODIES SUCH AS RETRO-REFLECTORS

[75] Inventors: Kurt Schwab, Innsbruck; Josef Steinlechner, Milserheide, both of Austria

[73] Assignee: D. Swarovski & Co., Wattens-Tirol, Austria

[22] Filed: Aug. 11, 1975

[21] Appl. No.: 603,491

[30] Foreign Application Priority Data

Aug. 13, 1974 Germany .................. 2438836

[52] U.S. Cl. .................. 65/66; 65/226; 65/250; 264/296; 425/352; 425/406; 425/410; 425/808

[51] Int. Cl.² ............ B29C 11/00; B29D 11/00; C03B 11/08

[58] Field of Search .......... 65/77, 78, 243, 320, 65/66, 207, 226, 250; 264/294, 296; 425/352, 383, 403, 406, 410, 808; 249/82

[56] References Cited
UNITED STATES PATENTS

| | | | |
|---|---|---|---|
| 2,241,415 | 5/1941 | Moulton | 425/808 X |
| 2,582,922 | 1/1952 | Crowley et al. | 425/352 X |
| 3,434,821 | 3/1969 | Wiley | 65/320 |
| 3,796,557 | 3/1974 | Sponseller | 65/77 |

Primary Examiner—S. Leon Bashore
Assistant Examiner—Richard V. Fisher
Attorney, Agent, or Firm—Neuman, Williams, Anderson & Olson

[57] ABSTRACT

A process of forming molded bodies is provided in which precisely formed surfaces thereof have a precise interval therebetween. Such bodies are formed in a mold in which a first set of forming dies engage an interposed plastic mass of glass or the like, whereafter at least one auxiliary forming die enters the mold to engage and form the yet plastic mass. The first set of forming dies define critical surfaces and have a fixed interval therebetween following engagement with the plastic mass. The auxiliary die defines a non-critical surface on the body to be formed in the mold and enters the mold a distance determined by the mass of the plastic body.

In a modified process of manufacture, the mold has an offset portion and is movable relative to the first forming dies whereby the mold cavity in which the plastic mass is disposed is reduced in volume and the desired body is formed having critical surfaces formed by the first forming dies.

10 Claims, 9 Drawing Figures

PRECISION MOLDING OF SHAPED BODIES SUCH AS RETRO-REFLECTORS

FIELD OF THE INVENTION

The invention relates to a process for producing "true-to-measure" or precisely shaped bodies of plastically moldable compositions, especially glass, and in particular to a process for the production of retro-reflectors having critical surfaces thereof precisely located and formed. This invention also pertains to apparatus adapted for the production of such shaped bodies.

BACKGROUND OF THE INVENTION

Retro-reflectors are optical devices which have the property of reflecting incident light back in the direction of the light source. These devices are often designated less exactly as reflex reflectors or reflectors. In principle there are two systems that are retro-reflecting, namely the triple mirror and the ball reflex elements (BRE) which are also known under the name of "cats' eyes".

Retro-reflectors manufactured from glass are becoming increasingly prevalent by reason of their special properties and especially by reason of their long working life and ability to retain high reflection values.

Retro-reflectors are used, for example, to increase safety on streets at night, along the edges of roadways or on the roadways themselves. The effectiveness of these retro-reflectors, in addition to their optical construction, is largely dependent on regular maintenance and care. In consequence of their exposed position on streets, for example, as ground marking nails, or in the immediate vicinity of streets, for example, as guidepost reflectors, all retro-reflectors are subject to extreme fouling. So that they can function properly, therefore, it is necessary to clean them regularly. The necessity for continuous cleaning can lead to progressive as well as considerable losses in reflection.

Thus, for example, reflex reflectors that are made of plastic, lose after about 25 cleanings up to 90% of their original reflecting capacity. Considerably better results are obtained with retro-reflectors of glass. The latter, after the same cleanings, lose only about 10% of their original reflecting capacity, and maintain these high reflecting values for years. Retro-reflectors of glass, therefore, have significant advantages over those made of plastic. For certain reflector applications glass retro-reflectors are used exclusively.

The production of shaped bodies of glass adapted for use as retro-reflectors presents, however, exceedingly higher manufacturing demands than the manufacture of plastic retro-reflectors.

Figure 2:
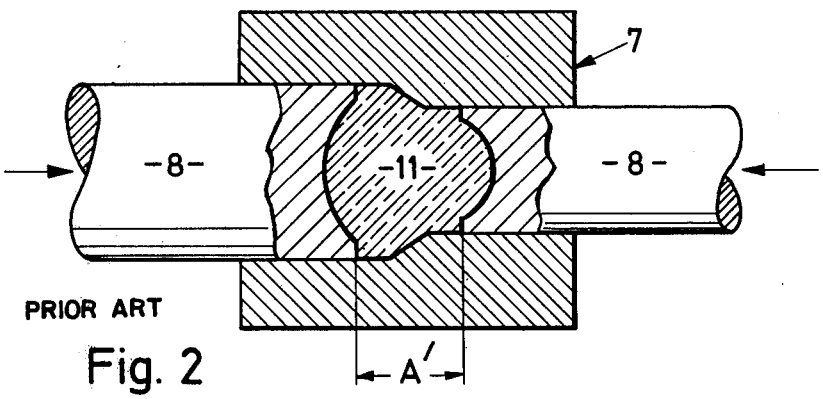
Figure 3:
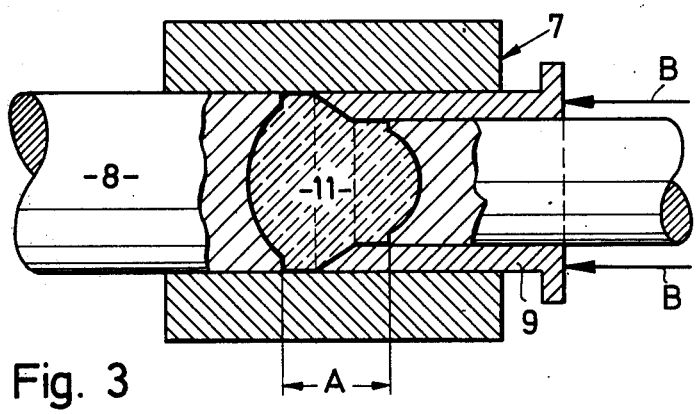
Figure 4:
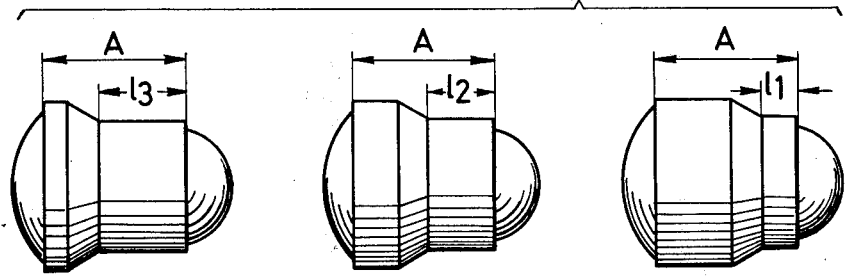
Figure 5:
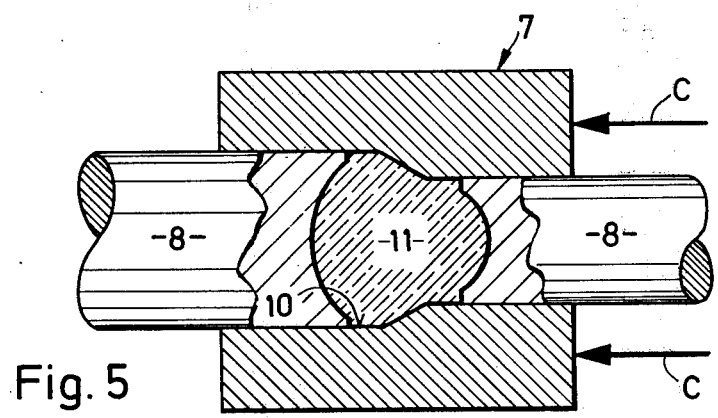
Figure 6:
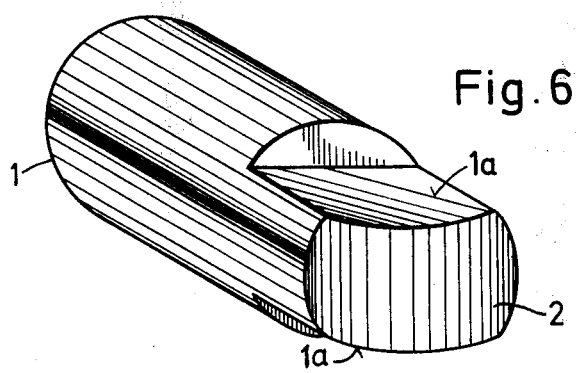

For a more complete understanding of this invention and the improvements provided thereby over the state of the art, reference should now be made to the drawings wherein:

FIG. 1 comprises side elevational views of ball reflecting elements as well as light beam paths for light entering therein parallel FIG. 1a and obliquely FIG. 1b to the optical axis;

FIG. 2 comprises a schematic sectional view of known prior art apparatus for the production of ball reflecting elements;

FIG. 3 comprises a schematic sectional view of an embodiment of apparatus made pursuant to this invention for the production of ball reflector elements;

FIG. 4 comprises elevational views 4a, 4b and 4c of ball reflector elements such as are made in accordance with the process of the invention having varying neck lengths;

FIG. 5 comprises a schematic sectional view of apparatus which may be employed in carrying out one embodiment of the provided invention; and FIG. 6 comprises a perspective view of a ball reflecting element embodiment manufactured in accordance with the provided invention.

In the various drawing views similar elements have the same reference numerals.

THE PRIOR ART

Typical spherical reflecting elements of well-known structure are shown in the two views of FIG. 1. The illustrated BRE comprise a spherical or an aspherically curved light entry surface 1 and a spherical mirrored reflector surface or surface in the form of a "step mirror" 2. The light entry and reflector surfaces have a common optical axis 3. The curvature of the light entry surface is dependent on the index of refraction of the glass used and on the desired scatter of the reflected light.

Paths for illustrative beams of light striking the BRE parallel (5) or obliquely (6) to the optical axis are likewise seen from FIG. 1. While the form of the light entry surface and the spacing between this surface and the reflector surfaces are established by the optical conditions, the formation of the optically inactive shell surfaces 4 is dictated by and adapted to satisfy the further-processing operations and installation requirements.

The production of the BRE's can be carried out by pincer pressure or by machine. Pincer printing is currently seldom used for reasons of economy.

The BRE manufacture by machine has hitherto been carried out in the following manner, and reference is now made to the apparatus illustrated in FIG. 2 for purposes of explanation. In FIG. 2 a glass composition 11 preheated to the plastic state is introduced into the cavity of a matrix or mold 7 (in FIG. 2 only schematically shown), which determines the form of the shell surface 4 of the final BRE construction. Opposed forming dies or tools 8 are introduced into the mold from opposed ends and press directly on the glass mass 11 which is formed into the ball reflecting element. This known method of manufacture, although permitting an economical production of the BRE, involves a drawback namely the BRE's produced in this manner have intolerable variances in the distance between the light entry surface and reflector surface. These varied spacings are caused by the fact that the glass blanks used for the formation of the BRE are not of equal mass. The mass of the glass blanks necessarily varies because of manufacturing procedures employed, from the desired mass value in a Gauss distribution.

Since in the known prior art processes the glass formation is carried out in such a way that the two forming tools act directly with a certain force on the preheated glass masses, the shaped bodies are obtained with intervals between the light entry surface and reflector surface which vary from the desired intersurface distance. To obtain reflection values as high as possible, it is necessary for optical reasons, to maintain a certain precise distance between the light entry surface and the reflector surface. The presence of a distance other than the optically prescribed distance between the light entry surface and the reflector surface causes a higher scatter of the reflected light. This has the accompanying undesired result of high losses of light. Glass mass variances of, for example, only 1% cause light value losses between 30% and 50%. These variances of the intersurface distances can thus render the BRE completely unusable.

The formation of glass blanks of constant mass is not feasible for technical and economic reasons. Processes for the preparation of glass masses having variances of less than ±1% in the range of 0.1 to 6 grams are in practice too expensive to be suited for commercial production. Inward movement of the forming tools a predetermined distance into the matrix would likewise fail to achieve desired BRE manufacture since glass blanks with smaller than optimum mass would not fully take on the form of the press tools or forming dies and would thus be unusable optically since, for example, the light entry surface formed as a lens would be incompletely shaped.

OBJECTS OF THE INVENTION

It is an object of this invention, therefore, to provide a process of manufacturing precisely shaped bodies, especially of molded glass, which can be used as retro-reflectors and which are characterized by high reflection values and low light scatter.

It is another object of this invention to provide a process of manufacturing reflecting bodies in which the critical distance between the light entry surface and reflector surface is precisely constant.

It is another object of this invention to provide a process in which molded bodies can be continuously manufactured and mass produced in an economically advantageous manner.

It is a further object of this invention to provide apparatus for the execution of the above processes.

These and other objects of the invention will become apparent from the following detailed description of the invention.

DESCRIPTION OF THE INVENTION

Underlying this invention is the realization that true-to-measure, or in part true-to-measure molded bodies formed of plastic, deformable compositions, especially glass formed for retro-reflectors, can be produced in a method whereby the press tools or forming dies are first brought into a certain spaced position in the mold. Subsequently the final pressing out or formation of the molded bodies takes place through further formation of the surface or surfaces which need not be maintained true-to-measure as, for example, the shell surface of the molded bodies.

In the method of this invention a composition such as glass is preheated to the plastic deformable state, placed in a mold or matrix and shaped with the aid of press tools or forming dies which, for example, are introduced into the matrix from opposed ends and press directly against the plastic mass. The press tools, in contrast to the known processes, are brought into a certain predetermined spaced relation. The final pressing out of the molded bodies then is accomplished by means of an additional tool whereby deformation of the plastic mass takes place on the surface or surfaces of the molded body which need not be maintained true-to-measure. The final pressing or molding step is effected by further reduction of the press or glass molding volume.

The invention is now explained in detail with special reference to the embodiment illustrated in FIG. 3 of the drawing. As mentioned above, after introduction of preheated glass blanks 11 into mold 7, forming dies or press tools 8, for example press stamps, are brought into a predetermined spaced relationship. At the completion of this process step the glass composition would normally incompletely fill the press volume. However, in the process according to this invention, glass blanks 11 with relatively less mass than hitherto employed in the prior art are used.

The final pressing out or molding of the glass parts is now accomplished with the press tools 8 in fixed position by one or more additional press tools or forming dies 9 introduced into the mold cavity. Thus the press volume or mold cavity for body formation is further reduced until the glass composition completely fills the resultant mold cavity. By reason of the introduction of one or more additional dies 9 there takes place a further deformation of the shell surface 4 of the glass molded body; for optical reasons a "trueness to measure" or precise configuration is not required of surface 4. The introduction of the additional press, die or dies 9 is, of course, effected while the glass composition 11 is still deformable.

According to the embodiment of the invention illustrated in FIG. 3, the additional die 9 comprises a sleeve arranged about a press tool 8 thrust into the mold cavity for such a time or to such a degree that the glass composition 11 completely fills the resultant cavity defined by portions of the tools 8, mold 7 as well as the end of die sleeve 9 itself.

Instead of the sleeve 9 which is in the nature of an additional forming die there can be thrust into mold 7 one or more press tools of modified shape.

Another embodiment of the provided invention will be explained in connection with FIG. 5. In the embodiment of FIG. 5 the glass composition 11 preheated to the plastic state is introduced into the mold 7, and with the aid of forming dies 8 which are introduced into the matrix from opposed ends and press directly against the glass mass, it is shaped. Additionally, however, with the dies maintained in fixed position, the matrix 7 is moved along the die axis in the direction of the illustrated arrows. The mold has an offset portion 10 which is formed in such a way that the movement of the matrix along the die axis in the direction indicated leads to a reduction of the mold body-forming cavity. This reduction in turn results in the entire forming cavity being filled by the glass composition. The mass compensation or reduction of the BRE formed is carried out here too on the optically inactive shell surface 4. The set-off 10 can, for example, be radially symmetrical. For certain applications, however, other set-off forms are equally suitable.

In FIG. 4 there are shown BRE's of various configurations which are produced by the process of this invention. Curvature and spacing of the lens' surfaces are identical in the illustrated embodiments and, therefore, the requirements for the desired optical conditions are fulfilled. Likewise the diameters of the BRE elements are the same, which is of importance for the further processing thereof. The mass differences of the glass blanks are expressed only as optically inactive variations in the neck lengths. Thus in illustrated BRE configurations 4c, 4b, and 4a, the neck lengths $1_1$, $1_2$, $1_3$ respectively, vary. Through suitable choice of the wall thicknesses of the sleeves 9 an the formation of the mold set-offs 10, the neck length fluctuations in the BRE's can easily be kept within desired limits.

In FIG. 6 there is shown a BRE whose shell surface 4 is not radially-symmetrically deformed. Such BRE can be used, for example, for ground marking nails, because in such application the angles of incidence in the vertical range fluctuate only very slightly, while for the horizontal range of incidence angles the full diameter of the BRE is utilizable.

Through use of the above described process of this invention the difficulties are avoided that arose in the hitherto-known methods of manufacture. Thus, the provided process effects a reduction of the reject rates as well as of the manufacturing costs.

A presorting of the glass blanks is no longer required. There can be produced glass molded bodies, especially retro-reflectors, which have better optical values because the glass molded bodies have a constant length. Thus constant intervals between the light entry surfaces and the reflector surfaces which lead to optimum reflecting properties are assured. This means also that for the production of reflector products for which the minimum reflection values are specified, fewer elements suffice. In the process of the invention, despite differing masses of the glass blanks used, there is achieved a constant distance between the light entry surface and the reflector surface. Through the process of the invention it is possible, accordingly, to produce optically ideal elements. A further advantage of the process of the invention is to be seen in that the optically tooled press tools or forming dies are subject to far less load than in the case of the usual deformation processes. This leads to greater useful life spans of the employed tools.

All ordinarily used types of glass can be worked by the process of the invention into true-to-measure glass molded bodies. Especially well suited are soda-lime glass types. Preferable types of glass contain about 2% to 30% sodium oxide, 2% to 12% calcium oxide and 50% to 80% silicon dioxide.

The glass blanks which may have for example a weight on the order of about 0.1 to 8 grams are heated before the pressing to a temperature at which they are plastically deformable. This temperature depends on the composition of the glass and lies in general in the range of about 600° C to 900° C especially 700° C to 800° C.

The pressing out of the glass molded bodies takes place under a pressure of up to 50 atmospheres, preferably the work is done at pressures between about 2 and 20 atmospheres. The subsequent additional shaping by the additional forming dies, or the movement of the matrix relative to the press tools in fixed position, however, takes place at lower pressure than the main pressing process, in order not to move the primary forming dies out of their fixed positions.

The apparatus elements of the provided invention are preferably heated in the normal course of use to avoid any excessively rapid cooling of the glass composition. The number, size and formation of the additional forming dies and the formation of the set-off 10 of the matrix are selected in such a way that proper formation of the glass blanks of different mass is assured. If the mass of the glass blanks fluctuates by ±2.5% then care must be taken that through the additional press tools and the movement of the mold there occurs a volume reduction of 5% so that in each case even the smallest glass blanks completely fill the press space or mold cavity and true-to-measure molded glass bodies are obtained.

The additional forming dies or die can, as above mentioned, be variably formed. Also, there are no limits in theory placed on the employment of the additional press tools. They can be introduced into the matrix from different sides or from one side and can act parallel to the axis of the glass molded bodies, perpendicular to it or in other direction to it on the molded body.

Also, one or more forming dies which can be differently shaped and guided or can, in part, be in fixed position, can be used in the apparatus according to the invention.

The invention is expressed in detail with the aid of the following example.

EXAMPLE

For the manufacture of BRE's there were used glass blanks with a mass of 0.2 gram. These showed a mass fluctuation of ±2.5%. The glass consisted of about 14.7% sodium oxide, 7.8% calcium oxide and 69.5% silicon dioxide, the rest being minor amounts of other components.

The glass blanks were heated to about 750° C. At this temperature they were plastically deformable. They were positioned in the mold of the press apparatus, schematically represented in FIG. 3 and pressed at a pressure of 5 atmospheres. The after-pressing or additional glass deformation took place with an additional press tool constructed as a sleeve which was capable of bringing about a reduction of 5% in the press volume or body-forming mold cavity. The pressure utilized in the "after-pressing" amounted to about 2 atmospheres.

There were obtained excellently formed BRE's which were distinguished by a constant spacing between the light entry and reflector surfaces. Comparative measurements with BRE's produced in accordance with prior art processes yielded an increase of the light value of 120% for the BRE's manufactured according to the provided invention.

The present invention was described above in particular with reference to ball reflecting elements. It is obvious, however, that with the process of the invention and the apparatus of the invention there can be manufactured glass shaped bodies of every kind in which trueness to measure is of significance.

Instead of glass there can also be used any other plastically deformable compositions suitable for the production of molded bodies.

We claim:

1. A process for forming a formable mass into a body having surfaces of precise, predetermined configuration and at least one other surface which need not be of precise configuration, comprising the steps of introducing such formable mass from which such body is to be formed into a mold having a cavity introducing forming dies into said mold; positioning said dies in a predetermined fixed relation while forming said mass into a preliminary shape having said surfaces of precise, predetermined configuration, and effecting a final molding of the formable mass by formation of said one surface which need not be of precise configuration while said forming dies are maintained in said fixed relation.

2. The process of claim 1 in which said formable mass is molten glass which is formed by said forming dies while at a temperature of between about 600° C to 900°

C and in combination with the step of allowing the final molded mass to harden.

3. The process of claim 1 in which the formation of said body surface which need not be of precise configuration is effected by reducing the volume of the mold cavity with said forming dies in fixed position until said moldable body is subjected to a desired pressure; said surface which need not be of precise configuration being simultaneously formed during the cavity volume reduction.

4. The process of claim 1 characterized in that with the forming dies in fixed position, one or more additional forming dies are thrust into the mold into engagement with said formable mass for forming at least one surface which need not be of precise configuration.

5. The process of claim 1 characterized in that with said forming dies in fixed position, the mold is moved relatively thereto with resulting volume reduction of the mold cavity in which said body is formed.

6. A process of forming a body having surfaces of precise configuration spaced apart a precise distance and formed from a formable mass; the steps comprising introducing a formable mass from which said body is to be formed into a first mold cavity; introducing forming dies into said cavity into a predetermined spaced relation and into engagement with said formable mass so as to define a smaller second cavity in conjunction with said mold, and reducing the size of the mold second cavity in which the formable mass is disposed still further as the forming dies remain in said predetermined spaced relation whereby said formable mass is subjected in a final mold cavity to a predetermined pressure.

7. Apparatus for molding a formable mass into a final molded body having surfaces which must be of precise configuration and at least one other surface which need not be of precise configuration, the combination comprising a mold; first forming means movable into said mold and adapted to form surfaces from said formable mass in said mold, which surfaces must be of precise configuration; said first forming means being disposed in a predetermined fixed relation after entry into said mold; at least one additional forming means for moving and urging said formable mass under pressure into contact with said first forming means with said first forming means in said predetermined fixed relation; said final molded body being formed in a cavity defined by said mold and the surfaces of said first and second forming means in contact with said formable mass; said first forming means surfaces defining said body surfaces which must be of precise configuration; said additional forming means defining said body surface which need not be of precise configuration.

8. The apparatus of claim 7 in which said first forming means comprise dies having end surface portions engageable with said formable mass which define the surfaces of said body which must be of precise configuration.

9. Apparatus for molding a formable mass into a body having surfaces which must be of precise configuration and at least one other surface which need not be of precise configuration, the combination comprising a mold having a cavity; forming means movable into said mold and adpated to form surfaces from said formable mass in said mold, which surfaces must be of precise configuration; said forming means being disposed in a predetermined fixed relation after entry into said mold; means for moving said mold relative to said forming means while in said fixed relation; said mold having a configuration whereby relative movement between said mold and said forming means reduces the size of the body-forming cavity in said mold and urges the deformable mass into engagement with said forming means.

10. The apparatus of claim 9 in which said mold cavity comprises concentric passageways of different diameter; said forming means comprising a plurality of dies each being snugly receivable in one of said passageways.

* * * * *